United States Patent [19]
Bouder

[11] 3,907,461
[45] Sept. 23, 1975

[54] HAND AIR PUMPS

[75] Inventor: Paul C. Bouder, Soisy sous Montmorency, France

[73] Assignee: Establissements Poutrait-Morin Societe Anonyme, Aubervilliers, France

[22] Filed: Apr. 22, 1974

[21] Appl. No.: 462,729

[30] Foreign Application Priority Data
Apr. 20, 1973 France .............................. 73.14566

[52] U.S. Cl. ..................... 417/63; 417/313; 73/389; 137/227
[51] Int. Cl.² ..................... F04B 21/00; G01L 19/06; F16K 15/20; F16K 37/00
[58] Field of Search ........ 73/389; 417/63, 555, 313, 417/454; 137/227

[56] References Cited
UNITED STATES PATENTS

| | | | |
|---|---|---|---|
| 1,425,614 | 8/1922 | Stickel | 417/63 |
| 1,649,530 | 11/1927 | Holsinger | 137/227 |
| 1,813,249 | 7/1931 | Mitchell | 73/389 |

*Primary Examiner*—William L. Freeh
*Assistant Examiner*—Richard E. Gluck
*Attorney, Agent, or Firm*—Diller, Brown, Ramik & Wight

[57] ABSTRACT

A combined bicycle pump and manometric gauge for measuring the pressure in a tire or other inflatable object at any time during the inflation of the tire by simply stopping the pumping movement of the pump operator and referring to a calibrated scale. A non-return valve is located at the downstream end of the compression chamber of the pump and displaceable in a chamber provided therefor; first and second passageways bring this chamber in communication with the tire through a rapid-connecting coupler and with the manometric gauge, respectively. The manometric gauge is disposed along the pump body parallel thereto and is held in place by a casing having an aperture for viewing an index slide.

14 Claims, 5 Drawing Figures

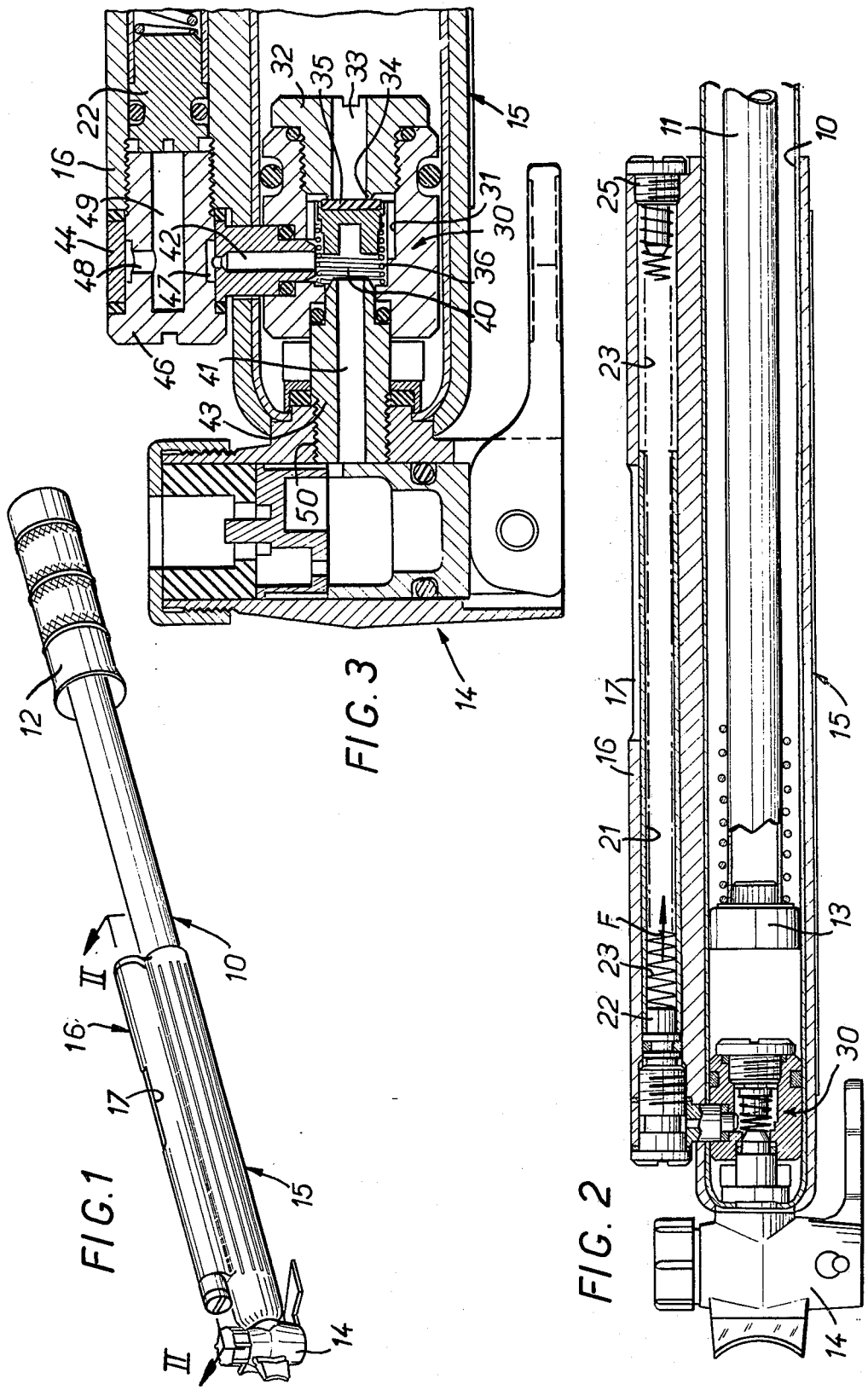

HAND AIR PUMPS

BACKGROUND OF THE INVENTION

The present invention relates to hand air pumps such as so-called bicycle pumps which are commonly used for inflating tires and other inflatable objects, such as playing balls, e.g. basketballs and footballs.

With known bicycle pumps the pressure of the tire being inflated can only be measured independently of the pump operation, i.e. when the pump has been disconnected from the tire, and in such cases the measurements are most often merely approximative.

Problems arise from this type of independent measurements; in particular the pressure present in the tire may be too high causing the tire to burst or too low which may cause damage to the tread of the tire.

In the case of bicycle tires, the efficiency of the tire is considerably reduced if the pressure in the tire is insufficient.

In the case of motorized two-wheeled vehicles, serious accidents caused simply by the tire pressure being too great or too low are unfortunately not uncommon.

SUMMARY OF THE INVENTION

An object of the present invention is to overcome the drawbacks set forth briefly above and provides for this purpose a hand air pump which, other than being of simple construction, is very practical in operation.

A more specific object of the invention consists in a hand air pump for inflating objects of the type including a pump body defining a compression chamber, a pump operating member with a piston displaceable in the compression chamber for compressing air therein, means for operatively coupling the pump to the object to be inflated being arranged at the delivery end of the pump, wherein the improvement comprises non-return valve means being disposed at the downstream end of the compression chamber, first and second passageways in communication with each other disposed at the downstream side of the non-return valve means, the first passageway also communicating with the coupling for carrying compressed air to the object to be inflated, and the second passageway being in constant communication with manometric pressure measuring means so that the pressure in the object being inflated can be measured at any moment during its inflation.

In a preferred embodiment, the manometric gauge or pressure measuring means is integrally formed with the pump; a casing is secured to the pump body, and has a hollow boss in which an index slide is adapted to displace in response to the pressure in the object in a straight slot parallel to the axis of the pump body.

With such a pump according to the invention it is possible to inflate a tire and at the same time measure the pressure therein.

It is therefore of course possible to inflate the tire to exactly the predetermined pressure.

Other features and advantages of the invention will become apparent from the description which follows, given by way of example with reference to the accompanying drawings.

BRIEF DESCRIPTION OF THE DRAWINGS

FIG. 1 is a perspective view of a portable bicycle pump according to the invention;

FIG. 2 is a partial longitudinal section view taken on the line II—II in FIG. 1;

FIG. 3 shows the delivery end of the pump on a larger scale;

DESCRIPTION OF THE PREFERRED EMBODIMENTS

Figure 4:
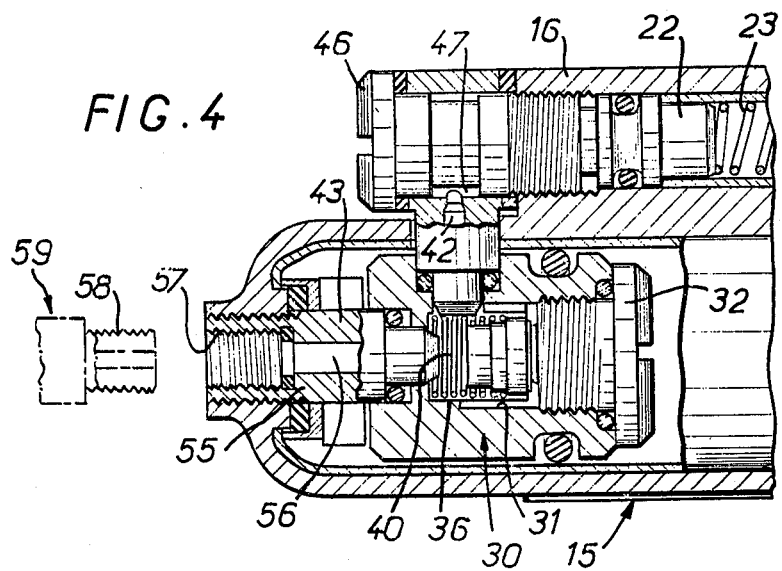
FIG. 4 is a view similar to that of FIG. 3 for an alternative embodiment.

In the embodiment illustrated in FIGS. 1–3, the hand air pump according to the invention is a so-called bicycle pump and comprises a pump body 10, an operating rod 11 having at one end a piston 13 mounted for reciprocating movement in the cylindrical compression chamber formed by the pump body and a hand grip 12 at the opposite end thereof.

In the illustrated embodiment the pump is provided at its delivery end with a quick-coupling connector as disclosed in a copending U.S. Application Ser. No. 349,311 entitled "Quick Coupling Connectors", filed on Apr. 9, 1973, and assigned to the assignee of the present application, which is fixed in place and designated generally by the reference numeral 14.

According to the invention, a casing designated generally by the reference numeral 15 is engaged substantially without play by the delivery end of the pump, and comprises a longitudinal boss 16 having an aperture 17 along which a calibrated tubular index slide 21 associated with a slide piston 22 is displaceable.

A spring 23 (FIG. 2) bears at one end against the slide piston 22 and at its other end against the stopper 25.

Valve means designated generally by reference numeral 30 is housed inside the pump body 10 (see FIG. 3) and includes a generally cylindrical sleeve.

The cylindrical sleeve defines an axial bore 31 threadedly engaging a hollow screw 32 having an axial passage 33, the end of the axial passage being located in the bore 31 and forms the seat 34 of a non-return valve 35 which is biased against the seat by the spring 36.

The bore 31 forms a chamber 40 in which the spring 36 is housed, a first passageway 41 and a second passageway 42 opening into the chamber 40.

The passageways 41 and 42 are formed in tubular connecting members 43 and 44 respectively, the connecting member 43 being axially oriented in the pump and the connecting member 44 being substantially radially oriented therein.

The connecting member 44 is secured in place by a threaded member 46 at an end of the longitudinal boss 16, the threaded member 46 having an annular peripheral groove 47 adapted to be located facing the channel 42 and communicating with a blind axial bore 49 in the threaded member 46 through a radial passage 48. The outlet orifice of the blind bore 49 being located facing the slide piston 22.

Thus the chamber 40 is in communication with the slide piston 22.

The connecting member 43 effects by means of its threaded end 50 the assembly of the quick-connecting coupler with the pump body as well as the communication of the coupler and the chamber 40 through the passageway 41.

During inflation of the tire or other inflatable object, the movement of the hand grip 12 in a direction towards the delivery end of the pump causes the piston 13 to compress air in the compression chamber of the pump body 10. This compressed air lifts the check valve 35 and flows through the passageways 41 and 42 to the inflatable object and the manometric pressure measuring device, respectively.

When the movement of the piston 13 is brought to a stop along its path of movement in the pump body, at any point in time during the inflation of the object, the air compressed in the air chamber of the inflatable object returns toward the pump body, assuming that the valve provided on the inflatable object is in inflating position.

The air in the passageways cannot pass into the compression chamber of the pump body since it is blocked by the sealing member of the check valve 35 which bears against the seat 34 under the force of the spring 36.

Accordingly, the air flows toward the passageways 42, 47, 48 and urges the slide piston 22 which is held in its initial or rest position by a calibrated spring.

As the pressure exerted on the slide piston 22 increases, the slide piston 22 moves in the direction indicated by the arrow F (FIG. 2) and compresses the calibrated spring 23 which thereby effects the displacement of the index slide 21.

The reading of the pressure is then effected in a graduated zone of the casing 16 along the aperture 17.

When the pump is disconnected from the valve of the inflatable object, the compressed air present in both the pump body and the different passageways and passages, etc. is exhausted along the path formed by 49, 48, 47, 42, 40 and 41 which is favored by the return of the index slide and the slide piston to their initial positions under the return force of the spring 23.

With reference to FIG. 4, like parts are designated by the same numerals as in the previous embodiment. It is noted that the connecting member 43 of the previous embodiment is replaced by a connecting member 55 with an axial passageway 56 communicating with the chamber 40 and comprising a threaded portion 57 adapted to receive the threaded end 58 of a convention detachable coupling 59.

Figure 5:
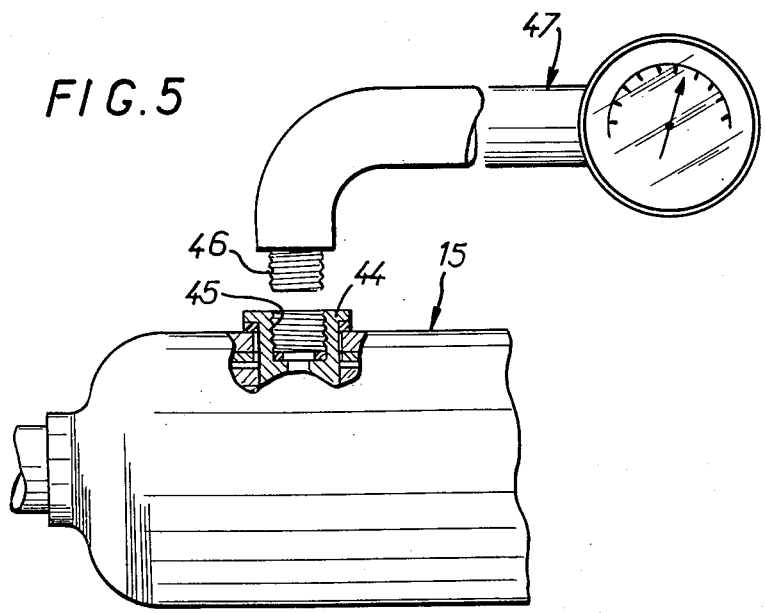
FIG. 5 shows another alternative embodiment according to the invention.

With reference to FIG. 5, the connecting member 44 has a tapped portion 45 adapted to receive the threaded end portion 46 of a manometric gauge or pressure measuring device designated by reference 47.

According to the last embodiment, it is noted that the pump body may, as in the previous embodiments, have a fixed coupling or a detachable coupling.

The invention is of course not limited to the embodiments illustrated and described herein but on the contrary includes all variations and modifications within the scope of the appending claims.

What I claim is:

1. A hand air pump comprising an elongated pump body, said pump body being of a generally 8-shaped transverse cross-sectional configuration defining a compression chamber and a manometric pressure measuring chamber, said compression chamber including a delivery end, a piston displaceable in said compression chamber for moving air toward said delivery end during the displacement of said piston toward said delivery end, a tubular coupler at said delivery end through which air is delivered to an object to be inflated, a non-return valve assembly disposed in said compression chamber at said delivery end between said piston and said tubular coupler, said valve assembly including a first passageway extending generally axially of said compression chamber and a second passageway extending generally transversely of said compression chamber, a valve chamber in said valve assembly, a valve body in said valve chamber for normally closing fluid communication between said compression chamber and said valve chamber through said first passageway but being openable upon the movement of said piston toward said delivery end, said second passageway being in fluid communication with said valve chamber and said manometric pressure measuring chamber, an index slide disposed for sliding movement in said manometric pressure measuring chamber under the influence of pressurized air delivered into said last-mentioned chamber through said second passageway, and an aperture in said pump body through which said index slide is viewable.

2. The hand air pump as defined in claim 1 including means biasing said index slide in a direction toward said delivery end.

3. The hand air pump as defined in claim 1 including a closure closing said manometric pressure measuring chamber at the delivery end thereof, said closure including an axial bore opening into said manometric pressure measuring chamber, a transverse bore in said closure opening into said axial bore, and a peripheral groove in an exterior surface of said closure placing said transverse bore in fluid communication with said second passageway.

4. The hand air pump as defined in claim 2 wherein said biasing means is a spring.

5. The hand air pump as defined in claim 2 including a closure closing said manometric pressure measuring chamber at the delivery end thereof, said closure including an axial bore opening into said manometric pressure measuring chamber, a transverse bore in said closure opening into said axial bore, and a peripheral groove in an exterior surface of said closure placing said transverse bore in fluid communication with said second passageway.

6. The hand air pump as defined in claim 4 including a closure closing said manometric pressure measuring chamber at the delivery end thereof, said closure including an axial bore opening into said manometric pressure measuring chamber, a transverse bore in said closure opening into said axial bore, and a peripheral groove in an exterior surface of said closure placing said transverse bore in fluid communication with said second passageway.

7. A hand air pump comprising an elongated pump body, said pump body defining a compression chamber and a manometric pressure measuring chamber, said compression chamber including a delivery end, a piston displaceable in said compression chamber for moving air toward said delivery end during the displacement of said piston toward said delivery end, a non-return valve assembly disposed in said compression chamber at said delivery end, said valve assembly including a sleeve having an axial bore, a screw having a passageway threadably coupled to said sleeve, said last-mentioned passageway being in fluid communication with said compression chamber, said screw defining a valve seat, a valve body disposed in a valve chamber of said sleeve and normally seated upon said valve seat, means normally biasing said valve body against said valve seat, a tube for conducting air from said valve chamber to an object to be inflated, a hollow plug defining another passageway in constant fluid communication with said valve chamber and said manometric pressure measuring chamber, said hollow plug passing through an opening of said pump body, and means coupled to said manometric pressure measuring chamber for indicating the pressure of an inflated object in response to pressurized air delivered to said manometric pressure measuring chamber through said hollow plug.

8. The hand air pump as defined in claim 7 wherein said tube includes an axial passage opening into said valve chamber, and means for coupling said tube to said pump body delivery end.

9. The hand air pump as defined in claim 7 including a transverse bore in said sleeve receiving said hollow plug, and said tube being in communication with said screw passageway.

10. The hand air pump as defined in claim 7 wherein said compression chamber is defined by a separate tubular housing disposed in intermost telescopic relationship with said pump body.

11. A hand air pump comprising an elongated pump body, said pump body defining a compression chamber and a manometric pressure measuring chamber, said compression chamber including a delivery end, a piston displaceable in said compression chamber for moving air toward said delivery end during the displacement of said piston toward said delivery end, a non-return valve assembly disposed in said compression chamber at said delivery end, said valve assembly including a sleeve having an axial bore, said axial bore is in part defining a valve chamber, a valve body in said valve chamber normally closing communication between said compression chamber and an outlet end of said bore adapted for fluid communication with an object to be inflated, passage means continuously and uninterruptedly placing the valve chamber in fluid communication with said manometric pressure measuring chamber, said passage means is defined by another sleeve disposed transversely to said first mentioned sleeve, a piston in said manometric pressure measuring chamber, means biasing said piston toward said delivery end, and means for converting the displacement of said manometric measuring chamber piston away from said delivery end into an indication of the pressure within an inflated object.

12. The hand air pump as defined in claim 11 including a separate tube in coaxial relationship with said sleeve axial bore, and a spring for biasing said valve body to its normally closed position.

13. The hand air pump as defined in claim 12 wherein said pump body is of a generally 8-shaped transverse cross-sectional configuration which defines said compression and manometric pressure measuring chamber.

14. The hand air pump as defined in claim 13 wherein said sleeve bore receives a tubular threaded sleeve, and said tubular threaded sleeve includes a valve seat for said valve body.

* * * * *